April 12, 1960
I. M. ROBINSON ET AL
2,932,630
POLYMERS OF BICYCLO(2.2.1)-2-HEPTENE
Filed May 16, 1956
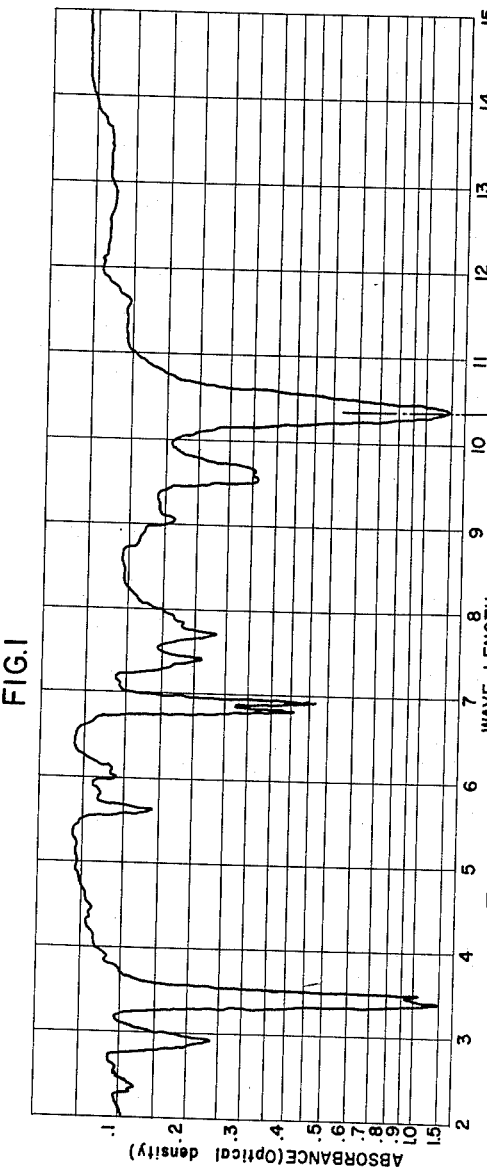
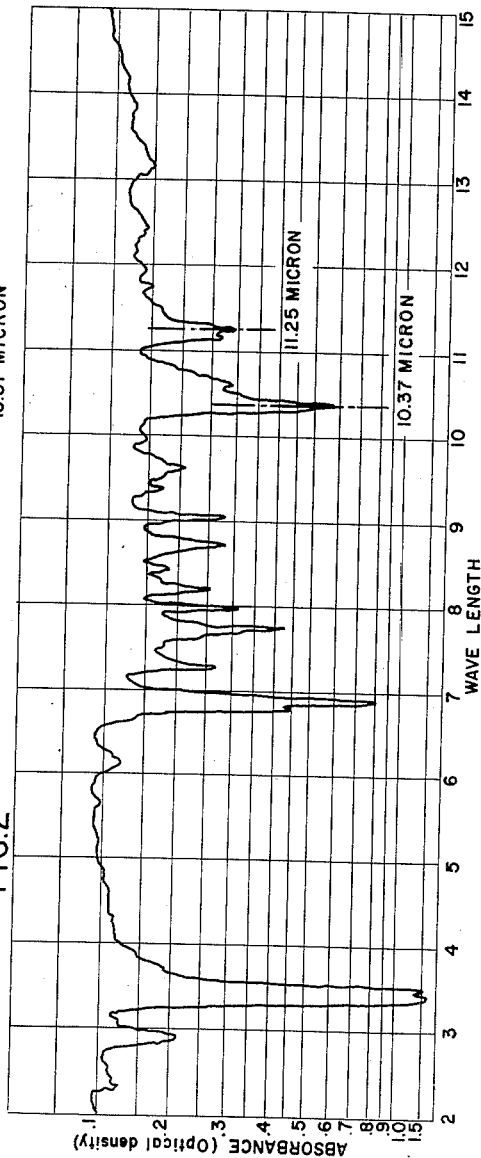
INVENTORS
IVAN MAXWELL ROBINSON,
LOUIS HERMAN ROMBACH,
WILLIAM LAWRENCE TRUETT
BY
*Allan B. Plumley* ATTORNEY

United States Patent Office 2,932,630
Patented Apr. 12, 1960

2,932,630
POLYMERS OF BICYCLO(2.2.1)-2-HEPTENE

Ivan Maxwell Robinson, Wilmington, Louis Herman Rombach, Claymont, and William Lawrence Truett, Wilmington, Del., assignors to E. I. du Pont de Nemours and Company, Wilmington, Del., a corporation of Delaware Application May 16, 1956, Serial No. 585,326

4 Claims. (Cl. 260—93.1)

This invention relates to improved polymers of bicyclo(2.2.1)-2-heptene, which are tough and cold-drawable plastic materials.

Solid polybicyclo(2.2.1)-2-heptene has been described in U.S. 2,721,189, issued to A. W. Anderson et al., on October 18, 1955. This material is prepared by the polymerization with a titanium catalyst which contains titanium at a valence state below three. The catalyst is obtained by admixing a titanium compound, having titanium at a valence state above three, preferably a titanium halide such as titanium tetrachloride with a reducing agent capable of reducing the titanium to a valence state below three. Reducing agents capable of reducing titanium to a valence state below three are such compounds as Grignard reagents, organometallic compounds, metal hydrides and alkali and alkaline earth metals. Preferred reducing agents are organometallic compounds such as lithium aluminum tetraalkyls, aluminum trialkyls, magnesium diaryls and lithium alkyls. On combining the titanium compound with the reducing agent, a reaction takes place, the products from which form a catalytically active complex, which appears to be only slightly soluble in hydrocarbon solvents. This complex is believed to be capable of coordinating with hydrocarbon monomers, having ethylenic unsaturation, and thereby cause the polymerization of ethylenically unsaturated monomers. It is possible that the monomer is adsorbed on the surface of the catalytically active complex.

While solid polybicyclo(2.2.1)-2-heptene, hereinafter referred to as polybicycloheptene, is described in the above-mentioned patent, it is to be understood that the polymeric mixture disclosed therein was too brittle for certain applications and this brittleness limited its utility. It is, therefore, the main objective of the present invention to prepare improved polymers of bicycloheptene which, when molded into films and other objects, are tough and cold-drawable. It is a further object to provide a process by which tough polybicycloheptene can be obtained. Another object is to prepare a polybicycloheptene which can be molded and fabricated without the aid of a plasticizer.

In accordance with the present invention a tough, cold-drawable polybicycloheptene is prepared by contacting bicycloheptene with a catalyst, said catalyst being the product obtained on reducing a titanium halide in the presence of an inert hydrocarbon until all of the available titanium has been reduced to a valence state below three, and said polymerization being carried out in the absence of any available titanium halide in a valence state above two. It has now been discovered that bicycloheptene can be polymerized to more than one form of polybicycloheptene, which polymers vary significantly in their structures and physical properties. The two types of polybicycloheptenes are obtained depending on how the monomer is polymerized. In particular, the formation of the tough variety of polybicycloheptene depends on avoiding any unreduced or partially reduced titanium contacting the monomer during polymerization.

In the process of the present invention bicycloheptene is polymerized to form a polymer consisting, with the exception of the chain ends, of the following recurring chain units.

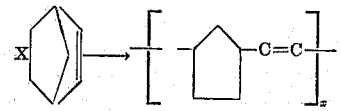

The determination of the polymer structure is based on analytical methods and tools available at the present time.

To obtain this form of polybicycloheptene, which is the tough or homogeneous type of polybicycloheptene, the polymerization of bicycloheptene must be carried out under certain critical conditions. Thus, it was found that this type of polybicycloheptene is obtained only where all of the available titanium has been reduced to the catalytically active state, which causes polymerization, prior to the addition or polymerization of bicycloheptene. Although polybicycloheptene will readily polymerize to a solid polymer where the reaction mixture contains only some of the titanium in a reduced valence state having catalytic activity, the polymer formed will be of the brittle or inhomogeneous type. The reason for the formation of the two types of polybicycloheptene is, at the present time, not clearly understood. Apparently, however, in the homogeneous type of polybicycloheptene, polymerization has occurred through a ring opening reaction at a bridgehead, and not through the double bond, which not being a terminally unsaturated bond, is relatively inert to polymerization. In the inhomogeneous type of polybicycloheptene it is believed that some rearrangement of the monomer, prior to or during polymerization, occurs which changes the structure of the polymer chain. This rearrangement is caused by the titanium halide in the unreduced or partially reduced stage in which the titanium does not act as a polymerization catalyst. Such effects of the titanium halides may be explained by the Friedel-Crafts type of catalytic activity of titanium halides.

The catalyst employed in the present invention is formed by the reduction of titanium halides. Although titanium halides are preferably employed, catalytic activity useful in polymerizing ethylenically unsaturated monomers has been found in reduced transition metal halides wherein the metals are selected from groups IVb, Vb and VIb of the periodic table of elements, and which may also be employed in the process of the present invention. In addition to titanium halides, vanadium halides and combinations of titanium and vanadium halides form extremely active catalysts in the process of the present invention.

The reduction of the titanium halides is accomplished by the use of alkylating agents which appear to act as strong reducing agents. As stated hereinabove, it is essential that all of the available titanium is reduced to a valence state below three prior to contact with the monomer.

The term available, as employed in the present invention, denotes that quantity of titanium which is available for contact with the monomer and thus available for polymerization. Since the catalyst, on reaction of the titanium with the reducing agent, is formed as a precipitate, it is very possible that some of the titanium halide is occluded by precipitating catalyst and is thus not available for reduction or polymerization. Such occluded titanium has no effect on the bicycloheptene.

The catalyst formation is accomplished by employing strong reducing agents which are organometallic compounds having the formula $MR_n$ wherein R is a hydrocarbon radical, M a metal selected from the class consisting of alkali metals, alkaline earth metals and aluminum and $n$ the number of metal to hydrocarbon bonds, and employing these reducing agents in excess of the stoichiometric quantity necessary to achieve titanium in a valence state below three. Although weaker reducing agents can be employed, the reaction rate of the reduction of the available titanium is not achieved within a short period. The quantity of reducing agent required to achieve complete reduction of the titanium within a reasonable time will, of course, vary with each reducing agent employed. In general, the strength of the reducing agents decreases from alkali metal alkyls, alkaline earth metal to aluminum alkyls. The quantity of reducing agent necessary to achieve complete reduction of the titanium halide to a valence state below three can be determined readily by small scale polymerization runs with increasing amounts of the same reducing agent, using bicycloheptene as the monomer. As soon as all of the available titanium is reduced to a valence state below three, the tough, cold-drawable type of polybicycloheptene is formed, which is readily distinguishable from the brittle material formed when the reduction is incomplete. Another method that may be used in determining the quantity of reducing agent required to obtain essentially all of the titanium in a valence state below three is the potentiometric titration of the titanium halide dissolved in a conducting solvent with the reducing agent. However, this method has certain limitations, such as the difference of the solvent employed in the polymerization and the solvent used for titration. Nevertheless, an estimate of the quantity of reducing agent required may be obtained. For the preferred reducing agent, lithium aluminum tetraalkyl, the molar ratio of the reducing agent to the titanium halide must be above 0.8, and preferably the ratio is about one. When an aluminum trialkyl is employed, the ratio must be above three and is preferably above five. It is furthermore essential, as pointed out hereinabove, to reduce the titanium to the catalytically-active state prior to contact with bicycloheptene to be polymerized. Thus, the polymerization process is generally carried out by admixing the catalyst components in the presence of a hydrocarbon solvent and thereafter adding the monomer to the catalyst mixture, allowing sufficient time for the reduction to occur. Although the reduction is rapid, it is not instantaneous. The time required for reduction may again be determined by small-scale experiments or by potentiometric titration. In general, it was found that the reduction is essentially completed after five minutes when employing the strong reducing agents listed hereinabove.

The polymerization of bicycloheptene may be carried out over considerable range of temperature and pressure. The temperature may be varied from 0 to 250° C., but is preferably from 50 to 150° C. The pressure may be varied considerably. However, since bicycloheptene is a liquid at the preferred reaction temperatures, atmospheric pressure is generally employed. The polymerization is preferably carried out in the absence of oxygen and moisture, which have deleterious effects on the catalyst. Inert gases, such as helium or nitrogen, may be employed in the polymerization. Hydrocarbon solvents containing no ethylenic unsaturation may, in general, be employed as polymerization media; however, those which are liquid at the polymerization temperatures are preferred since they avoid the need of pressure equipment. Such a hydrocarbon solvent is, for example, decahydronaphthalene.

The attached drawings show the infra red spectra of the two types of polybicycloheptene which can be obtained employing a titanium catalyst containing titanium at a valence state below three. The solid polymer heretofore obtained, evidently contained two or more types structure, and there has been no recognition heretofore that improved properties could be achieved by making a polymer having only one of these structural types. The spectrum shown in Figure 1 represents the spectrum obtained from a sample of polybicycloheptene prepared according to the process of the present invention. The spectrum shown in Figure 2 represents the spectrum of a sample of polybicycloheptene as known heretofore. It can readily be seen that the two spectra vary considerably in their appearance, the spectrum of the polybicycloheptene in Figure 1 being less complicated than the one represented in Figure 2. The bands found most useful in identifying the structure of the polybicycloheptene and distinguishing the two types of polymer are the band found at 10.37 micron and the band found at 11.25 micron. The band found at 10.37 micron indicates the presence of ethylenic transunsaturation in a hydrocarbon molecule. A quantitative estimate of the band in Figure 1 shows that this type of polybicycloheptene has the unsaturation as a part of the repeating unit in the polymer chain. Further proof of this type of unsaturation is found in the reaction of polybicycloheptene with bromine or with peracids which substantially decreases or even eliminates the band. The proof of the structure of polybicycloheptene, as obtained according to the process of the present invention, is obtained by ozonolysis, which shows that the product obtained from the ozonolysis of polybicycloheptene is cis-1,3 cyclopentane dicarboxylic acid. A comparison of the infra red spectrum of the ozonolysis product and pure cis-1,3 cyclopentane dicarboxylic acid shows substantially the identical spectrum in each case. Although, as can be seen in Figure 2, the 10.37 micron band is also found in the brittle type of polybicycloheptene, it is not as strong in the brittle type of polymer as it is in the tough type of polymer. This shows that fewer of the repeating chain units have the structure indicated hereinabove. Thus, the polymer represented in Figure 1 may also be identified as homogeneous polybicycloheptene, whereas the polymer represented in Figure 2 is an inhomogeneous polybicycloheptene. Ozonolysis of the brittle, inhomogeneous polybicycloheptene under identical conditions results in an ozonolysis product which, in addition to the 1,3 cyclopentane dicarboxylic acid, contains other oxidation products.

The difference in structure of the two types of polybicycloheptene is further indicated by the adsorption band at 11.25 mircrons found only in the inhomogeneous polybicycloheptene. This adsorption band is characteristic of vinylidene unsaturation. This adsorption band has, at the present time, not yet been identified with a specific structure in the polymer chain, but it shows the presence of a structure in the polymer chain different from that found in the homogeneous polybicycloheptene.

The homogeneous and inhomogeneous polybicycloheptenes vary significantly in their physical properties. The homogeneous polymer, when sintered, results in tough, cold-drawable products. Although both polymers are very stiff, the inhomogeneous polybicycloheptene is very brittle. The tensile impact strength measured under the same conditions is 42.9 ft. lbs./inch for the tough polymer, while the brittle polymer is too brittle for measurement. The X-ray crystallinity of the homogeneous polymer was measured to be 12 to 25% with a crystalline melting point at 180 to 205° C. The brittle polybicycloheptene was found to have a crystallinity of 5 to 40% and a crystalline melting point above 300° C. Both materials, however, have no distinct melting points at which the material becomes liquid. Even at high temperatures the polymer was found to have an extremely high melt viscosity.

The process of the present invention is further illustrated by the following examples:

*Example I*

Into an Erlenmeyer flask containing 0.0022 mole of lithium aluminum tetraheptyl dissolved in 60 ml. of decahydronaphthalene under an atmosphere of dry nitrogen was added 0.0027 mole of a 1:1 mixture of titanium tetrachloride and vanadium tetrachloride. (Ratio of reducing agent to metal halide 0.8.) The resulting mixture was gently agitated for 5 minutes. After 5 minutes 24 g. of bicycloheptene diluted with 12 cc. of decahydronaphthalene was added at room temperature. The polymerization was allowed to proceed for 17 hours. The resulting product was then washed in succession with one 400 ml. portion of butyl alcohol and three 400 ml. portions of acetone. To each washing 0.05 g. of N,N′-diphenyl paraphenylene diamine was added as a stabilizer for the polymer. The filtered and dried polymer weighed 4.2 grams. The polymer was found to have an inherent viscosity of 0.66 when measured in a 0.1% solution in alpha-chloronaphthalene at 125° C. A compression-molded film pressed at 210° C. was tough, creasable and could be cold-drawn. The density of the film was found to be 1.005. The infra red spectrum obtained from the film was that illustrated in Figure 1.

*Examples II to IV*

Employing the same procedure as in Example I, bicycloheptene was polymerized with the quantities of reducing agents set forth hereinbelow with the following results:

| Example | Quantity of LiAl (Heptyl), Moles | Ratio of Reducing Agent to Metal Halide | Weight of Polymer, g. | Inh. Viscosity | Density |
|---|---|---|---|---|---|
| II | 0.0028 | 1.04 | 10.0 | | .990 |
| III | 0.0034 | 1.25 | 9.3 | 0.50 | .996 |
| IV | 0.0040 | 1.5 | 8.0 | | 1.000 |

The polymer obtained in each example could be compression-molded into tough films which were found to have the infra red spectrum illustrated in Figure 1.

*Example V*

Example IV was repeated except that the bicycloheptene was added to the reaction mixture prior to the addition of titanium tetrachloride. There was obtained 2 g. of a solid polymer having an inherent viscosity as measured in a 0.1% solution in alpha-chloronaphthalene at 125° C. of 0.30. A film was molded from the product. The film was brittle. The infra red spectrum obtained from the film corresponded to the infra red spectrum shown in Figure 2.

*Example VI*

Into an Erlenmeyer flask was charged under an atmosphere of nitrogen 0.01 mole of titanium tetrachloride and 0.00625 mole of lithium aluminum tetraheptyl in 50 ml. of decahydronaphthalene. (Ratio of reducing agent to metal halide =0.6.) The mixture was allowed to stand for 10 minutes and then 40 g. of norbornylene was added at room temperature. The polymerization was allowed to proceed for 3 days. The resulting reaction mixture was treated with excess butyl alcohol and acetone. The polymer was filtered, washed and dried, and 8.0 g. of a solid polymer of bicycloheptene was obtained. A brittle film molded from the material at 250° C. showed essentially the same spectrum indicated in Figure 2.

*Example VII*

Example I was repeated, employing 0.0027 mole of titanium tetrachloride and 0.014 mole of aluminum triisobutyl (ratio of reducing agent to aluminum trialkyl 5). There was obtained 6.2 grams polybicycloheptene which could be molded into tough stiff films having essentially the same infra red spectrum as shown in Figure 1.

*Example VIII*

To 700 ml. of decahydronaphthalene containing 0.040 mole of lithium aluminum tetraheptyl was added under nitrogen 0.036 mole of titanium tetrachloride at room temperature. The reaction mixture was agitated for 5 minutes and 200 g. of bicycloheptene in 100 ml. of decahydronaphthalene was added. The reaction mixture was heated to 90° C. and maintained at that temperature for 4 hours. The reaction mixture was cooled and poured into excess butyl alcohol containing 1.5 g. of N,N′-diphenyl paraphenylene diamine as a stabilizer for the polymer. On filtering, washing with acetone and drying there was obtained 134.8 g. of a solid polymer having an inherent viscosity of 0.8. The material should be pressed into tough, stiff films. The polymer could be melt-extruded into beading at 270° C.

The examples hereinabove have illustrated the preparation of the two types of polybicycloheptene which are obtained depending on the critical process conditioned employed in the polymerization. The polybicycloheptene obtained by the process of the present invention may be blended with other hydrocarbon polymers. Pigments, fillers, stabilizers and plasticizers are readily added to the polymer. The tough polybicycloheptene is useful in the preparation of films and molded articles. The polymer is characterized by the high degree of property retention at elevated temperatures which is exceedingly surprising by hydrocarbon polymers.

We claim:

1. A normally solid poly-3-cyclopentanylvinylene having a crystalline melting point at 180° to 205° C. and having an infra red spectrum characterized by a band at 10.37 microns having an optical density of greater than 1.0 and a band at 11.25 microns having an optical density of less than 0.2, said poly-3-cyclopentanylvinylene having been obtained solely through chain scission polymerization of bicyclo-(2.2.1)-2-heptene.

2. The process of polymerizing bicyclo-(2.2.1)-2-heptene to form a normally solid poly-3-cyclopentanylvinylene which comprises reducing a titanium halide in the presence of an inert hydrocarbon solvent with an organometallic reducing agent in at least stoichiometric quantities to reduce all of the titanium to a valence state below three, thereafter contacting said catalyst with bicyclo-(2.2.1)-2-heptene at a temperature of 0 to 300° C. and recovering a solid polymer of bicyclo-(2.2.1)-2-heptene.

3. The process set forth in claim 2 wherein the catalyst is obtained by admixing a lithium aluminum tetraalkyl with a titanium tetrahalide in a molar ratio of above 0.8.

4. The process as set forth in claim 2 wherein the catalyst is obtained by admixing an aluminum alkyl with a titanium tetrahalide in a molar ratio above 3.

References Cited in the file of this patent

UNITED STATES PATENTS

| 2,721,189 | Anderson et al. | Oct. 18, 1955 |
| 2,799,668 | Anderson et al. | July 16, 1957 |
| 2,831,037 | Schmerling | Apr. 15, 1958 |